Figure 1:
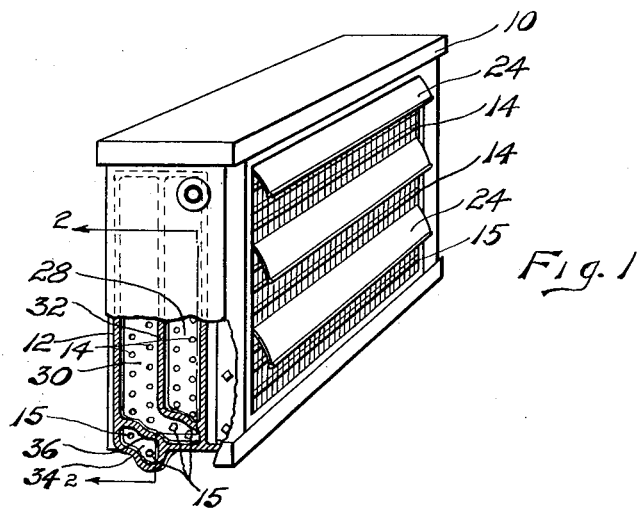

Feb. 10, 1931.   K. W. HAUPT   1,792,090

HEATER

Filed Oct. 9, 1928

INVENTOR
KARL W. HAUPT
BY Harry Dexter Peck
ATTORNEY

Patented Feb. 10, 1931

1,792,090

UNITED STATES PATENT OFFICE

KARL W. HAUPT, OF NORTH PROVIDENCE, RHODE ISLAND, ASSIGNOR TO GENERAL FIRE EXTINGUISHER COMPANY, OF PROVIDENCE, RHODE ISLAND, A CORPORATION OF DELAWARE

HEATER

Application filed October 9, 1928. Serial No. 311,398.

This invention relates to improvements in heaters. More especially it has to do with a heater having, in a comparatively small space, an exceedingly large area of heated surface from which heat is absorbed mainly by air moving rapidly through the heater. In particular the invention relates to a heater in which steam enters a number of tubes arranged in the path of a blast of air and is there condensed, and thereafter leaves the heater in the form of water or condensate.

From the standpoint of effectiveness it is necessary in heaters of this type to employ some form of trap for controlling the discharge of the condensate and particularly is it desirable to use a thermostatic trap because this trap, as compared to a float or bucket trap, is smaller, lighter, less expensive, and operates in accordance with temperature conditions alone and regardless of the quantity or weight of the condensate to be discharged. This latter feature, however, has heretofore prevented the close-coupling of the trap with the heater because the condensate thus entering the trap is at a temperature which holds the trap closed. Accordingly, the condensate builds up in the heater, cutting off space that should be utilized for condensation of steam, until the collected liquid cools down sufficiently for the trap to open. Thereupon there is a rush of the condensate through the trap followed by an enlarged flow of steam into the heater, all of which is accompanied by considerable noise due to the water hammers that invariably occur. Consequently, where traps of this type have been heretofore employed, it has been deemed necessary to provide a long cooling circuit between the heater and the trap and to take care of the collection of the condensate and to insure that it will be sufficiently cooled when reaching the trap to effect its own escape. This does not tend toward compactness and simplicity of equipment but on the contrary requires extended piping connections and is open to the very great objection that the location of the trap is left to the judgment of those installing the heater who quite frequently are not familiar with its operating characteristics.

It is a principal object of the present invention to provide a heater to which a thermostatic trap can be closely connected, in fact, attached directly to the discharge outlet of the heater preferably by the manufacturer at the time the heater is assembled. This is accomplished by providing in the heater a novel header for circulation of the steam and condensate, together with a short cooling circuit for the condensate in the path of the driven air through which circuit all the condensate must flow and to which the entering steam has no direct access. This arrangement results in the condensate being rapidly and sufficiently cooled within the confines of the heater, without undue collection and loss of condensing space, so that upon entering the closely connected trap it will cause operation of the latter and effect its discharge. Accordingly, the heater, when operating, does so at maximum efficiency and without fluctuation of heat output since its effective condensing space is always accessible to the steam. The latter is supplied at an approximately constant rate and the condensate leaves the heater with substantially uniform flow. Furthermore the invention eliminates the need of any large external cooling leg and remotely located trap and thereby enables the heater and trap to be assembled initially as a unit in a most compact and inexpensive manner.

It is intended that the patent shall cover by suitable expression in the appended claims whatever features of patentable novelty exist in the invention disclosed.

Figure 2:
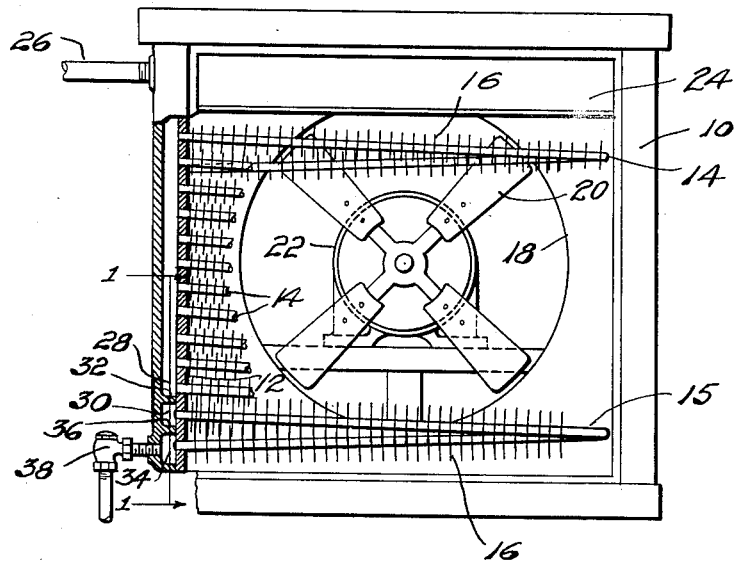

Figure 1 is a perspective of a heater embodying the present invention, with a part of the casing removed and a portion of the header wall cut away as on line 1—1 of Figure 2; and Figure 2 is a front elevation, with most of the condensing tubes cut off and showing a section through the header as on line 2—2 of Figure 1.

Referring more particularly to the drawings, the heater comprises a casing 10 enclosing a vertical header 12 and a series of U-shaped condensing tubes 14 and cooling tubes 15 which extend from the front portion of the heater across the interior of the casing and back to the rear portion of the heater.

Preferably these tubes are closely banked and provided with fins 16 to augment the heating surface. At the front the casing is almost entirely open and at the back has a circular opening 18 within which rotate the blades of a fan 20 directly connected to an electric motor 22. The fan forces a powerful blast of air through the casing past all the tubes and fins and into the surrounding atmosphere with direction of propagation initially determined by the setting of adjustable louvers 24 mounted across the front opening of the casing.

Steam is supplied through a supply pipe 26 to the header, being connected directly to an inlet chamber 28 thereof which extends from the top down the forward side to close by the bottom. The steam enters the forward legs of the condensing tubes 14 and is there condensed because of absorption of heat units by the passing air. The tubes are properly pitched so that the condensate formed in each tube naturally drains therefrom into the intermediate chamber 30 of the heater. This chamber is separated from the inlet chamber by a partition 32 which extends vertically from the top of the header to near its bottom where it turns forward and thereby cuts off from the inlet chamber the cooling tubes 15. These tubes, here shown as two in number in Figure 1 but only one of which, for clearness, is illustrated in Figure 2, return to a discharge chamber 34 of the header which is separated from the intermediate chamber by a second partition 36 near its bottom. To this discharged chamber a thermostatic trap 38 is closely connected.

The operation of the heater is as follows. Steam enters the inlet chamber 28 and passes directly to the condensing tubes 14. Here its temperature is sufficiently reduced by the transfer of heat units to the passing air to bring about condensation. The condensate thus formed, which is at nearly the same temperature as the steam, drains from the condensing tubes into the intermediate chamber 30, falls to the bottom onto partition 36 and runs into the pocket under the horizontal portion of partition 32, from which pocket it enters the cooling tubes 15. As the hot water moves through these latter tubes its temperature is promptly lowered because these tubes, like the condensing tubes, are bathed in the blast of air being driven through the casing. In consequence when this water or condensate reaches the discharge chamber 34 its temperature is such as to effect the opening of the thermostatic trap 38, and permit it to escape without any undue collection. In fact, it has been found in practice that there is a substantially uniform flow of condensate from the trap, leading to the conclusion that the latter is maintained in a nearly balanced condition.

It is to be noted that the entering stream has no opportunity to come in contact with the condensate after the latter has drained into the intermediate chamber and therefore has no chance to affect directly the temperature of the condensate. Likewise, all the condensate must flow through the lower tubes in order to reach the discharge chamber, and is therefore subjected to the cooling effect of the air blast. These features, namely the separation of the condensate from the entering steam and the cooling of the condensate within the confines of the heater, enable the thermostatic trap to be closely connected and to operate without any appreciable intermittent action. As a result, a heater embodying the invention is economical in its steam consumption and yet highly efficient because the maximum condensing space is maintained at all times free from any undue collection of condensate.

I claim:

1. A heater comprising a header having an inlet chamber for steam; a series of tubes connected thereto for reception of said steam; means creating a blast of air past said tubes whereby the steam is condensed; an intermediate chamber in said header connected with said tubes and adapted to receive the condensate; a discharge chamber from said header; and means connecting said intermediate chamber and said discharge chamber and extending into the path of the air blast for passage of said condensate.

2. A heater comprising a header having connection with a supply of steam; a series of tubes extending from and returning to said header; and means for creating a blast of air past said tubes; there being partitions in said header controlling the circulation of the steam and its condensate so that the steam is cut off from a portion of the tubes and the condensate is directed through said cut-off portion.

3. A heater having a series of tubes and means for creating a blast of air past them; a chamber in said heater having connection with a portion of said tubes; another chamber in said heater having connection with the tubes containing steam and being adapted to receive the condensate therefrom and having connection with other tubes also subjected to said blast of air and through which the condensate passes before discharge from the heater.

4. The combination of a heater adapted to receive and effect condensation of steam and a thermostatic trap closely-connected thereto for controlling the discharge of condensate from the heater; said heater comprising a portion for steam and another portion for the condensate and means connecting said portions and adapted to effect passage of all the condensate through the entire portion provided therefor; and there being means to create a blast of air past both said portions whereby the steam in one portion is condensed and the condensate in the other portion is sufficiently cooled to effect operation of said trap.

5. The combination of a heater and a closely connected thermostatic trap comprising a series of heat-giving surfaces exposed to a blast of air; means for directing steam into contact with a portion of said surfaces whereby it becomes condensed, and for collecting and directing all the condensate thus formed into contact with another portion of said surfaces whereby the condensate is cooled sufficiently to effect operation of said trap, and for directing said cooled condensate to said trap.

6. A heater comprising a casing enclosing a series of tubes; means for creating a blast of air through the casing past said tubes; and means for directing steam through a portion of said tubes and for collecting and directing all the condensate, formed therein, through another portion of the tubes and thence directing the discharge of the condensate from the heater.

7. A heater having an inlet chamber, a discharge chamber, and an intermediate chamber having connections with both of the first said chambers; said connections constituting a passage for steam from the inlet chamber to the intermediate chamber and a separate passage for condensate from the intermediate chamber to the discharge chamber; said connections being arranged in the path of a blast of air passing through the heater; combined with means for creating said blast of air.

8. A heater comprising a casing having a fan associated therewith for creating a blast of air therethrough; a header at one side of said casing having a vertical inlet chamber from the top of said header to near its bottom and having an intermediate chamber beside said inlet chamber and extending under the latter, a discharge chamber in the header below said intermediate chamber; a series of condensing tubes leading from the inlet chamber at one level to the intermediate chamber at a lower level and exposed to said blast of air wherein the steam is condensed and drains into the intermediate chamber; a cooling tube connecting the lower part of the intermediate chamber with the discharge chamber and exposed within said casing to the said blast of air, whereby the condensate passing therethrough is cooled.

9. A heater having a series of heat giving surfaces exposed to a blast of air; means for directing vapor into contact with a portion of said surfaces whereby the vapor becomes condensed; and means for collecting and directing all the condensate thus formed into contact with another portion of said surfaces whereby the condensate is cooled.

10. A heater having a series of heat giving surfaces exposed to a blast of air; means for directing vapor into contact with a portion of said surfaces whereby the vapor becomes condensed; means for collecting and directing all the condensate thus formed into contact with another portion of said surfaces whereby the condensate is cooled; and a discharge for said condensate from the heater.

11. A heater comprising, in combination, a series of tubes exposed to a blast of air; means for directing vapor through a portion of said tubes whereby the vapor becomes condensed; and means for collecting and directing all the condensate thus formed into another portion of said tubes and along their entire length, whereby the condensate is cooled; and means for discharging the cooled condensate from the heater.

Signed at Providence, Rhode Island, this 8th day of October, 1928.

KARL W. HAUPT.